US011170102B1

(12) United States Patent
Bhattacharya et al.

(10) Patent No.: US 11,170,102 B1
(45) Date of Patent: Nov. 9, 2021

(54) MITIGATION CONTROL OF INADVERTENT PROCESSING OF SENSITIVE DATA

(71) Applicant: Wells Fargo Bank, N.A., San Francisco, CA (US)

(72) Inventors: Nilotpol Bhattacharya, Bangalore (IN); Priyankant Singh, Bangalore (IN); Satish Babu S N, Bengaluru (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 414 days.

(21) Appl. No.: 16/274,916

(22) Filed: Feb. 13, 2019

(51) Int. Cl.
| G06F 21/55 | (2013.01) |
| G06F 21/62 | (2013.01) |
| G06F 21/60 | (2013.01) |
| G06N 20/00 | (2019.01) |
| G06F 21/31 | (2013.01) |

(52) U.S. Cl.
CPC ............ *G06F 21/556* (2013.01); *G06F 21/31* (2013.01); *G06F 21/604* (2013.01); *G06F 21/6254* (2013.01); *G06F 21/6272* (2013.01); *G06N 20/00* (2019.01); *G06F 2221/2125* (2013.01); *G06F 2221/2137* (2013.01); *G06F 2221/2141* (2013.01)

(58) Field of Classification Search
CPC ...... G06F 21/556; G06F 21/31; G06F 21/604; G06F 21/6254; G06F 21/6272; G06F 2221/2125; G06N 20/00
See application file for complete search history.

(56) References Cited

U.S. PATENT DOCUMENTS

| 7,716,242 | B2 | 5/2010 | Pae et al. |
| 8,141,166 | B2 | 3/2012 | Charlton |
| 8,646,032 | B2 | 2/2014 | Aad et al. |
| 8,769,621 | B2 | 7/2014 | Wechsler et al. |
| 8,844,032 | B2 | 9/2014 | Saidi et al. |
| 9,075,955 | B2 | 7/2015 | Schieman et al. |
| 9,088,450 | B2 | 7/2015 | Jung et al. |
| 9,218,497 | B2 | 12/2015 | Burger et al. |
| 9,407,665 | B2 | 8/2016 | Grodzicki et al. |
| 9,619,661 | B1 | 4/2017 | Finkelstein |
| 9,642,008 | B2 | 5/2017 | Wyatt et al. |
| 9,811,687 | B2 | 11/2017 | Flavin et al. |
| 9,852,309 | B2 | 12/2017 | Luria |
| 9,853,959 | B1 | 12/2017 | Kapczynski et al. |
| 9,928,381 | B2 | 3/2018 | Vidhani et al. |

(Continued)

FOREIGN PATENT DOCUMENTS

| CN | 104866760 | 8/2015 |
| EP | 2965257 | 6/2017 |
| WO | 2016015097 | 2/2016 |

*Primary Examiner* — Hee K Song
(74) *Attorney, Agent, or Firm* — Womble Bond Dickinson (US) LLP

(57) ABSTRACT

The innovation disclosed and claimed herein, in one or more aspects thereof, illustrates systems and methods for providing a technical control to a technically pervasive problem of inadvertent capture of items in a computing environment, returning control of what happens to such items in technical environments that have become widespread and intrusive. The innovation provides a system for users to control the types of items that pervasive computing environment elements may process without their express control with technical countermeasures in a relatively unobtrusive manner.

20 Claims, 6 Drawing Sheets

(56) References Cited

U.S. PATENT DOCUMENTS

| | | | |
|---|---|---|---|
| 10,152,611 B2* | 12/2018 | Hurwitz | G06F 21/556 |
| 2004/0103306 A1 | 5/2004 | Paddock et al. | |
| 2006/0272024 A1* | 11/2006 | Huang | G06F 21/577 |
| | | | 726/26 |
| 2012/0210388 A1* | 8/2012 | Kolishchak | G06F 21/552 |
| | | | 726/1 |
| 2012/0222083 A1 | 8/2012 | Vaehae-Sipilae et al. | |
| 2014/0230012 A1 | 8/2014 | Ahn | |
| 2016/0055344 A1* | 2/2016 | Peterson | G06F 21/629 |
| | | | 726/28 |
| 2016/0170730 A1 | 6/2016 | Ollikainen | |
| 2017/0140171 A1 | 5/2017 | Antonelli et al. | |
| 2017/0193218 A1 | 7/2017 | Shin et al. | |

* cited by examiner

US 11,170,102 B1

MITIGATION CONTROL OF INADVERTENT PROCESSING OF SENSITIVE DATA

BACKGROUND

In an ever-growing "Internet of Things" ("IoT") environment, the ability to provide a technical control over leakage of word(s), data, information and the like through an ever increasing and nearly ubiquitous presence of multi-party electronic processing devices is presently without suitable solutions. In fact, through the IoT, and the ubiquity of connected computing capability in even what may have once been considered ordinary household appliances, it is to be appreciated that often, a computing environment will exist without an active awareness on the part of a user of an extent of that computing environment and a nascent danger of leakage through that technical environment. Notwithstanding this ubiquity, technical controls that resolve these new problems presented by ever-growing technical computing environments have not kept pace.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of stopping leakage through third party devices in computing environments. The method includes pre-activation that provides for at least a starting reference point of system control. The method incudes post-activation that provides for an affirmative engagement with the control system and monitoring of a computing environment. The method includes trigger, in that a soft lock item is processed by the control system. The method includes post-trigger in that in some embodiments, a user may be informed of activity to which the control system has operated to mitigate leakage.

A system of the innovation may include a registration component that provides for pre-activation aspects of the innovation. The system may include an application component that provides for post-activation, trigger and post-trigger aspects of the innovation. It is to be appreciated that in some embodiments, application component may interact with or otherwise share some functionality with a registration component, for example, post-activation aspects may be performed by a registration component.

Embodiments of the innovation may include a computer readable medium having instructions to control one or more processors. The instructions can include pre-activating a system, obtaining affirmative authorization to engage the system, scanning a computing environment, triggering the system and applying post-trigger actions.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
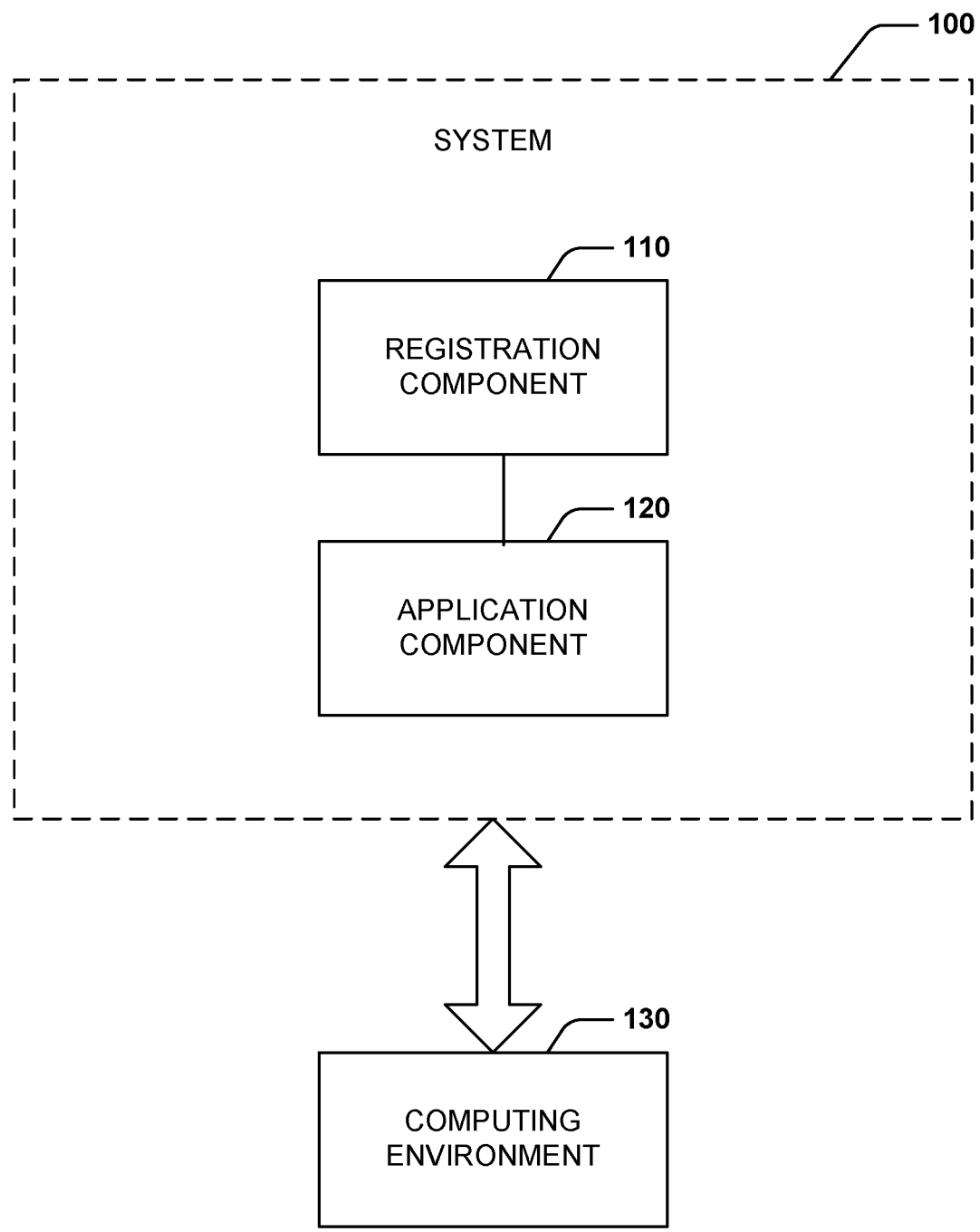
FIG. 1 illustrates an example component diagram of a system of the present innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

A broad view of the innovation disclosed herein is a deceptively simple one: apply technical controls over a computing environment within which one or more people have become immersed. This control of computing environment may be seen as having utility in a number of ways, including, but not limited to, the ability to control the flow of pre-determined (and related) sensitive word, data, information and the like. Often, examples may be provided in a sense of financial data, but other types of data having predetermined sensitivity are to be considered as being captured by the disclosed innovation.

The importance of the innovation is especially directed to a fact that many people have placed themselves into a computing environment with little or no active awareness of the extent of the elements in that computing environment. Many devices may be known and are actively promoted as active listeners to one's commands. Other devices, including most any number of items that may make up the Internet of Things ("IoT"), may not be so readily recognized by a user as being part of an active computing environment in which word, data, information and the like may be uncontrolled and thus picked up and processed in an uncontrolled manner by third parties through the computing environment. In this sense, although security has always been more or less a concern with sensitive data, the modern day problem of extensive computing environments call for a modern day computing, or technical, solution set.

The innovation disclosed herein includes a setting up and implementing a solution that acts as a master controller of a computing environment. Such an item may operate in one or more different computing environments. For example, a computing environment may be a mobile computing environment, as for example, the interior of an automobile or the like. In another embodiment, a computing environment may be a private residence. In another embodiment, a computing environment may be a public environment. In another embodiment, a computing environment may be a business environment, It is to be appreciated that computing environments may involve one or more of these example environments.

Turning to FIG. 1, an embodiment of the innovation is presented in a system view for controlling leakage in computing environments in real time or near real time applications. System 100 may comprise a registration component 110 and an application component 120. Registration component 110 may provide controls and settings (rules) by which operation of a controlling system may be run (for example integrated into a controls component that may be part of the application component 120, as will be discussed later. Registration may include setting word(s), data, information and the like, that may be deemed desired to be controlled. In some embodiments, registration may include setting the context of word(s), data, information and the like, that may be deemed desired to be controlled. It is to be appreciated that many examples disclosed herein may be based on financial word(s), data, information and the like may be financial in nature, but other types (or sets) of word(s), data, information and the like may be registered. Types or sets may include personal sets, medical sets, business (or business intelligence) sets, or combinations of these sets. Registration component 110 may involve determining a key set of items to which the innovation provides a soft lock as will be discussed herein. It is to be appreciated that in some embodiments, registration component 110 may be communicatively coupled with application component 120, either continuously, near continuously, or intermittently. In some embodiments, application component 120 may subsume registration component 110.

Application component 120 may provide the operation of the system once registration is complete. At a broad level, application component 120 may detect a conversation in a computing environment 130, may detect one or more elements of a computing environment (not shown) and may control the technical processing of the computing environment 130 in so far as soft lock items are processed, as have been determined through at least registration component 110. It is to be appreciated that computing environment 130 may be more than one type of environment. For example, computing environment 130 may be a home environment. In a home environment, a user may well be aware of a number of items in the computing environment that may be capable of acting on information disclosed by the user. However, the user may not always be aware (or remember) that devices are active. Additionally, in the sense of the Internet of Things ("IoT"), a user may well be unaware (or not remember) of the capabilities or activities of a number of other computing items in a computing environment.

It is to be appreciated that application component may be provided in a plurality of computing environments 130. Sets of settings captured by a registration component may include a set based on at least the nature of the computing environment 130. Sets of settings may be modified by an application component 120. Sets of settings may thus also include sets based on the registration component, or based on both the registration component 110 and the application component 120. As will be discussed in greater detail in relation to one or more components of the application component. In some embodiments, an application component may be integrated into other devices (for example, a smart phone, or a third party virtual assistant, or a standalone computing device). In this sense, application component may be a specialty component (for example, such as specialty component 622 as discussed later in relation to FIG. 6). In other embodiments, an application component may be its own computing device (for example, such as computing device 618 as discussed later in relation to FIG. 6).

Figure 2:
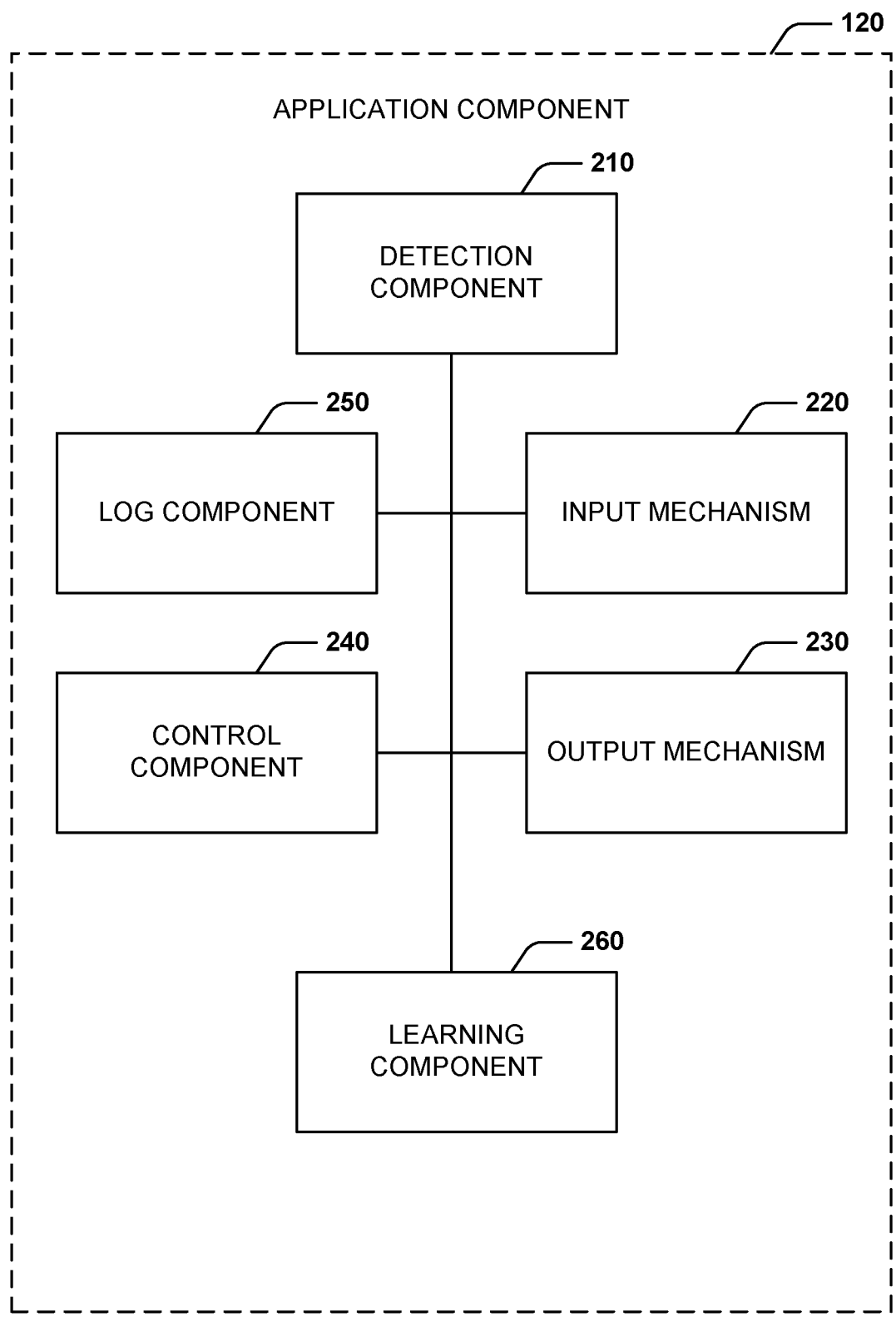
FIG. 2 illustrates an example component diagram of an application component.

Turning to FIG. 2, a more detailed embodiment of an application component, for example, application component 120 of FIG. 1 is illustrated. Application component 120 may comprise a detection component 210. Detection component 210 may detect a computing environment, word(s), data, information and the like in the computing environment, as well as context of word(s), data, information and the like in the computing environment. In an embodiment, detection component 210 may detect computing device(s), or element(s), in the computing environment, which may include, but not be limited to virtual assistants ("VAs"), items with IoT capabilities, and the like. The disclosed innovation provides for detection of active devices, passive devices, and/or passive devices that become active during operation of the innovation.

Detection component 210 may also detect a user's presence in a computing environment, and in an embodiment, may detect a user's authorization for system use. It is to be appreciated that application component 120 may comprise, or may be communicatively coupled to, a computing input mechanism 220 and a computing output mechanism 230. It is to be appreciated that embodiments may vary with different types of input mechanism 220 or different types of output mechanism 230 or both. Input mechanism 220 may include audio input devices, data input devices, and the like. Input mechanism 220 operate to enable detection component 210 to detect a computing environment, for example, computing environment 130 of FIG. 1, and the word(s), data, information and the like that occur in the computing environment as well as user and user interactions. As will be discussed in greater detail in relation to FIGS. 3 and 4, input mechanism 220 may also provide for the affirmative authorization in certain embodiments of methods of the disclosed innovation. Input mechanism 220 may include devices for capturing computing indicators, for example, without limitation, a mouse click, a screen swipe, or data entry. Additionally or alternatively, input mechanism may be provided for capturing auditory interactions.

Output mechanism 230 may provide for interaction between portions of application component 120 (for example, control component 240, which will be discussed later) and other computing devices of the computing environment (for example, VAs, IoT devices and the like), as well as in some embodiments, a data storage or log component 250. Output mechanism 230 may provide the ability for an application component to announce itself and interact with a user in order to affirmatively engage in an operation of control of a computing environment. In some embodiments, the output mechanism may provide for auditory or visual indicators.

It is to be appreciated that application component 120 may comprise a log component 250 and this log component 250 may in some embodiments be localized or contained within the application component 120 and in other embodiments may be displaced from, but communicatively coupled to, an application component 120.

Application component 120 may comprise a control component 240 that controls a technical computing environment, for example, computing environment 130 of FIG. 1, and mitigates word, data, information and the like leakage through the computing environment. As will be discussed in further detail in relation to FIGS. 3 and 4, control component 240 operates based at least in part on a registration component, for example, registration component 110 of FIG. 1, and a key list of predetermined items that generate a soft lock with the system in operation. It is to be appreciated that soft lock may comprise one or more types of control associated with the items deemed sensitive as one or more sets of such items. Types of control may include masking of the identified item such that transmission of the identified item is rendered unintelligible. Types of control may include applying a white noise filter associated with identified items. Types of control may include taking over operational control of VAs, IoT devices and the like. A control component may employ a soft lock mechanism to control the ability of VA, IoT items and the like within a detected computing environment from immediately acting on a soft lock item. In some embodiments, this may be accomplished by way of masking the soft lock item. Additionally, or alternatively, this may be accomplished by controlling the processing of the VA, IoT item and the like by overriding a local "send" command. Additionally, or alternatively, this may be accomplished by disrupting the timing of a "send" command, and making any such "send" command reliant on an authorization condition created by a control component.

In an embodiment, a log of devices in a computing environment may be captured or maintained in a log component, for example, log component 250. It is to be appreciated that in some embodiments, a log component 250 may be separate from, but communicatively linked to application component 120, while in other embodiments, log component 250 may be integrated with the application component 120.

In an embodiment, application component 120 may comprise a learning component 260 that may augment a predetermined list, using artificial intelligence techniques to augment the items that may trigger soft lock operation. As will be discussed in further detail in relation to FIGS. 3 and 4, control component 240 may operate based at least in part on the registration component and a key list of designated items. In some embodiments, control component 240 may operate additionally or alternatively based at least in part on items generated by learning component 260 with the system in operation. Learning component 260 may take a predetermined list and using standard and conventional artificial intelligence techniques, may provide for additional words, or phrases, or words or phrases in certain contexts, to which a soft lock feature may be triggered. Additionally or alternatively, learning component 260 may employ techniques on items captured by log component 250.

Application component 120 may include a learning component 260. Learning component 260 may develop and update the application component over time by learning from the analyzed information for future application component actions using machine learning techniques, artificial intelligence, deep learning intelligence, and/or the like. In some embodiments, control component 240 may prioritize deployment of configurations based on input from learning component 260.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Figure 3:
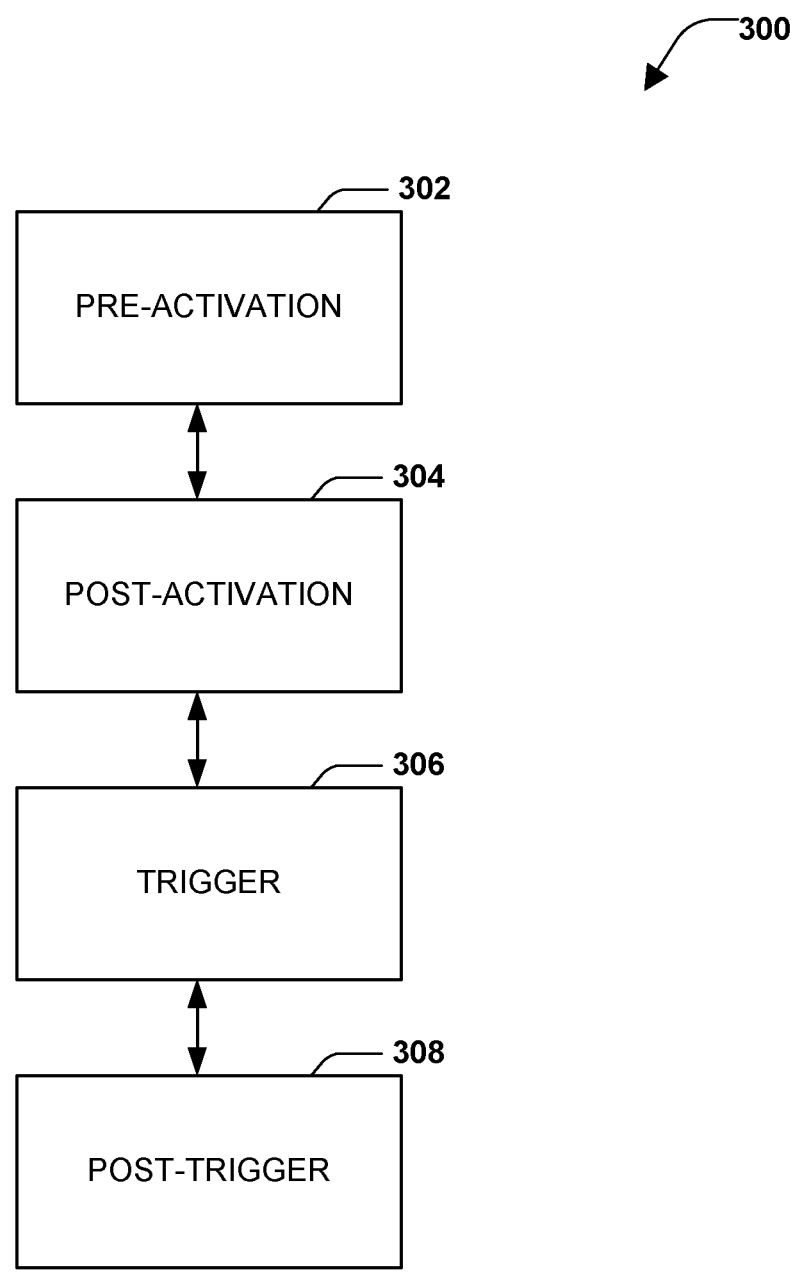
FIG. 3 illustrates an example method relating to aspects of the innovation.

Turning now to FIG. 3, an embodiment of a method according to aspects of the innovation is presented. At 302, a step of pre-activation is undertaken. The step of pre-activation may involve a registration component, for example, registration component 101 as discussed in FIG. 1. It is to be appreciated that registration component 110 may, upon registration, capture selected word(s), data, information and the like. A capture may be of one or more sets of such items, as may be desired. Sets may be of particular sensitive subject matter, such as for example, financial word(s), data, information and the like (items), medical items, or selected business items. It is to be appreciated that the set or sets of word(s), data, information and the like are considered to be of a nature as to be desired to be controlled from inadvertent leakage. Additionally, or alternatively, context of such items may also be captured. In some embodiments, the step of pre-activation may involve one or more components of an application component, for example, application component 120 as discussed in relation to FIGS. 1 and 2. For example, a log component, such as log component 250 and a learning component, such as learning component 260 may be involved at the pre-activation step. For example, pre-activation may populate a log component with an initial data store. For another example, learning component 260 may influence a pre-activation step by providing "lessons learned" either to a single application component, or to a plurality of application components for use in one or more different computing environments. In another example, a detection component, such as detection component 210 may operate as discussed in relation to FIG. 2, to detect elements of a computing environment, a use, and a user's affirmative approval to activate the control system. At step 304, post activation may be enacted. It is to be appreciated that from step 302 to step 304, the control system is activated through an affirmative action of the user, as will be discussed later. Upon detection of a user, an application component may inquire as to permission to be activated on a basis. The basis may be an ongoing basis or some other basis as disclosed herein. In some embodiments, such permission may be enduring (or until revoked), or in some embodiments, may last until a sleep mode is encountered. It is to be appreciated that activation may be different in different embodiments, based at least on options or embodiments discussed. Upon an affirmative indication, the application component may then operate continuously or near continuously (for example, in some embodiments, a "sleep" mode may enable power savings). In an operating mode, an auditory stream of a user and/or a computing environment is monitored for indicators on a predetermined list (or in some embodiments, on a list augmented by artificial intelligence techniques).

At 306, trigger step is taken. Trigger step may involve elements of an application component, for example, application component 120 as discusses in relation to FIG. 2 (such as, for example, detection component 210 or input mechanism 220, or both). It is to be appreciated that a trigger step may involve a control component such as for example control component 240 as discussed in relation to FIG. 2. A control component may be configured to employ a soft lock to items in a particular set or sets. In operation, a computing environment may be subject to a system monitoring the use of set items. If a set item is used in the computing system environment, the control component triggers a soft lock and the set item may undergo controlling action. Embodiments of controlling action are discussed in more detail herein in relation to FIGS. 2 and 4.

At 308 post-trigger step is taken. It is to be appreciated that post trigger step may involve elements of an application component, for example, application component 120 as discussed in relation to FIG. 2 (such as, for example, output mechanism 230 or control component 240 or both). In certain embodiments, an application component through an output mechanism may prompt a user that an identified VA, IoT device or the like may transmit an item that has been soft locked. In embodiments, the application component may provide a user with a notice and additionally or alternatively, the application component provides the user with a notice and request to allow transmission of soft locked word(s) through the VA, IoT device and the like.

Figure 4:
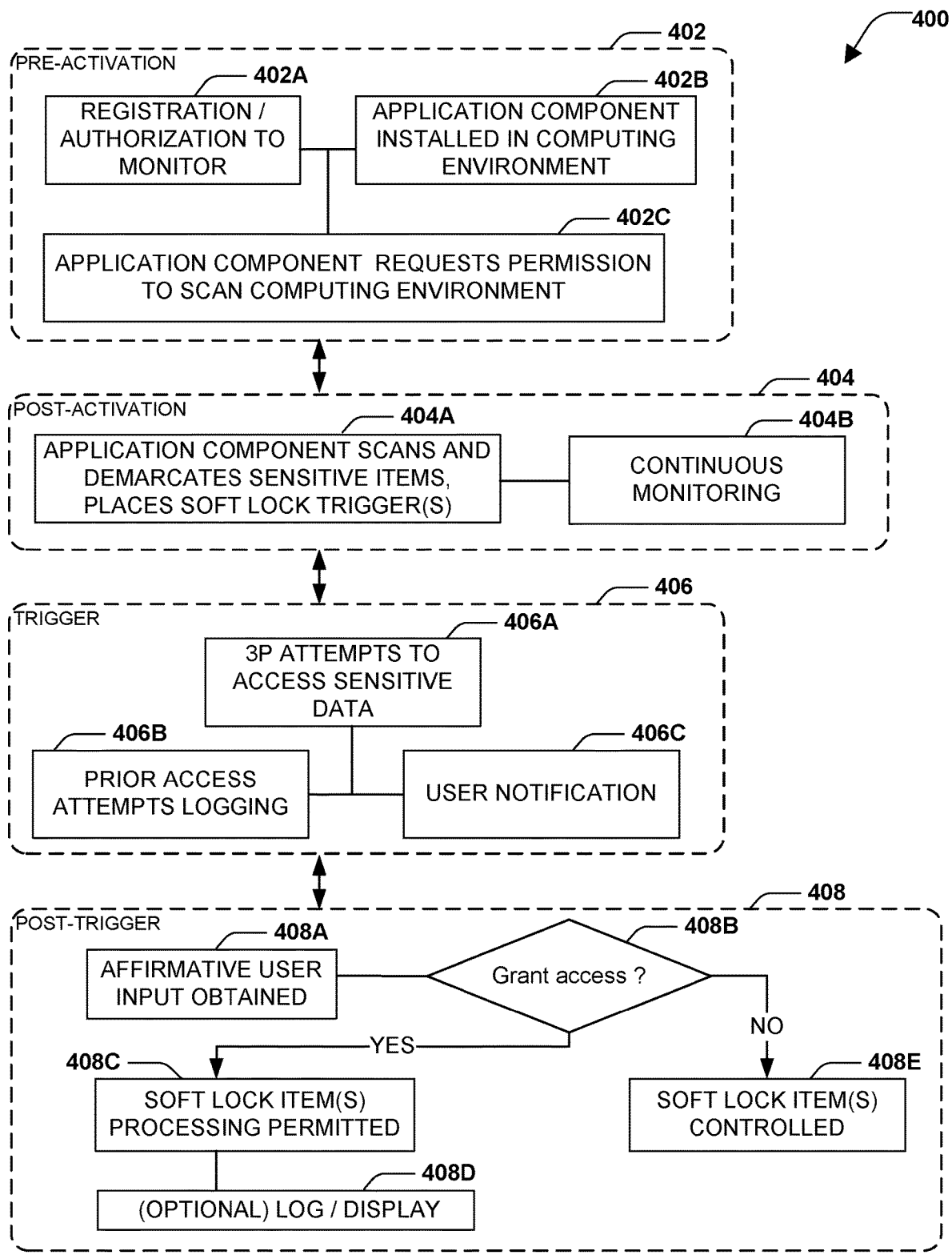
FIG. 4 illustrates a more detailed example method relating to aspects of the innovation.

Turning now to FIG. 4, an embodiment 400 is disclosed that illustrates a more detailed example method relating to aspects of the innovation. At 402 a pre-activation stage is entered upon. At 402A, registration may occur through, for example, a registration component such as registration component 110 as discussed in relation to FIG. 1. In such a registration activity, a user may authorize a controlling party to monitor a computing environment for a selected period. It is to be appreciated that the controlling party may be a user or may be a non-user. The selected period may be a number of periods, based on agreed upon settings. For example, an agreed upon setting may be a period in which a triggering event occurs up to a set time period of no activity which may induce a sleep mode. In another example, an agreed upon setting may be a period in which an authorization provides continuous permission until a revocation of authorization is enacted. It is to be appreciated that selected data sets may be as disclosed previously, That is, selected data sets may be data sets for which soft lock trigger mechanisms have been set for one or more sets of sensitive word(s), phrases, date, information and the like, such as for example, financial word(s) or phrases, medical word(s) or phrases, or business-selected word(s) or phrases.

A user may install an application component in a computing environment. The installation of the application component may be associated with a registration activity. It is to be appreciated that authorization may occur in a number of manners and times. Authorization may additionally or alternatively occur after registration and after installation of an application component at 402B.

At 402C, an application component may request affirmative permission to scan a computing environment. It is to be appreciated that in an embodiment, this scan may include scanning of computing devices for recorded instances of soft lock trigger items and noting such instances for later action. It is to be appreciated that "scan" may be performed by a detection component, for example, detection component 210 as discussed in relation to FIG. 2.

At 404, a post-activation phase is active. At 404A, an applicant component may scan and demarcate sensitive data that meets a predetermined (or augmented) soft lock trigger mechanism setting. It is to be appreciated that soft lock triggers are placed, and that actions in a trigger 406 and post trigger 408 stages (as discussed herein) may occur simultaneously or near simultaneously. At 404B, continuous monitoring is put into effect. It is to be appreciated that by continuous monitoring, various modes of monitoring as discussed previously in relation to a detection component, such as detection component 210 as discussed in relation to FIG. 2, or in relation to a control component, such as control component 240 as discussed in relation to FIG. 2 are indicated. This may include modes of monitoring for user presence, computing device(s) (active, passive, and/or passive becoming active) in a computing environment and the like.

At 406, the trigger stage is active. During the course of monitoring, at 406A a VA, IoT or like device may attempt to process (access) an item that has been demarcated as a soft lock item. With such an occurrence, in some embodiments, prior attempts at access of such a soft lock item may be noted; for example, a log may be referenced or updated or both as may occur with a log component such as log component 250 as discussed in relation to FIG. 2. In some embodiments, log data of prior attempts may carry forward specific permission attributes or other factors that may drive a control component, such as control component 240, as discussed in relation to FIG. 2. In some embodiments, notices may be logged, tracked, trended, and otherwise treated by a learning component, such as learning component 260, as discussed in relation to FIG. 2. At 406C, a user may be notified of a current attempt to pass along or process a soft lock item.

At 408, a post-triggered stage is active. With user notification, at 408A an authorization from a user in an affirmative manner may be obtained. It is to be appreciated that the 408A access grant is an affirmative action decision, and may proceed as discussed prior per a control component, such as control component 220 as discussed in relation to FIG. 2. It is to be appreciated that an affirmative action decision is one in which a user acts in a deliberate manner to provide authorization. Various modes, as may be known in the art are to be considered as included in the innovation as disclosed. Modes may include a predetermined swipe action on an input mechanism 220 enabled to receive such input. Modes may include a data entry action on an input mechanism 220 enabled to receive such input. Modes may include a verbal indication, selectively distinct so as to mitigate against most all inadvertent verbal utterances, with an input mechanism 220 enabled to receive such input. Modes may include a biometric indication, with an input mechanism 220 enabled to receive such input. It is to be appreciated that a clear affirmation indication may be a selected or unusual indication pre-set by a user in a registration phase.

It is to be appreciated that a log component, for example log component 250 as related to the discussion of FIG. 2 may retain permissions, authorizations, preferences, and the like, and may be set to trend or otherwise act with a control component, for example, control component 240 as related to the discussion of FIG. 2, to control permissions and the like based at least in part on a log, or additionally or alternatively on other factors, for example, factors that may be set at a registration. For example, at registration, permission may be set such that once affirmatively authorized, the permission is of limited duration. In this manner, authorization may be enabled for a specific occurrence, and the ability to control inadvertent leakage in a computing environment is not compromised for other occurrences, for example, by a prior instance in which permission had been granted. It is to be appreciated that the terms authorization and permission may be used interchangeably.

It is to be appreciated that upon detection of at least a subset of at least an initial set of items deemed sensitive (either through a registration process or through an augmentation of a registration process by way of a learning component), a control component may prompt an access grant determination. For the access grant determination being deemed allowed, an element detected by a detection component may process the subset of the at least initial set and wherein for the access grant determination being deemed not allowed, a control unit does not permit the element to process the subset of at least initial set unaltered. Alteration is to be understood as indicated herein as being one or more of the various embodiments of control.

At 408B, the affirmative user input of whether to grant access or not at 408B is processed. If, as permission is granted, then at 408C, processing of soft lock items is permitted. It is to be appreciated that permitted processing would be by identified devices, such as for example third party applications of VAs, IoT devices and the like. In embodiments, a user may be provided with an option of permitting the soft lock item to be transmitted as uncontrolled. It is to be appreciated that permission may be controlled by a control component, for example, control component 240 as discussed in relation to FIG. 2. In embodiments, control of permission may be time or context based. For example, permission may be provided for a specific occurrence or for a specific amount of time. It is to be appreciated that settings of time or specific amounts of time may be particular (for example, for the next ten minutes) or may be less particular (for example, for a current conversation, or active session). Additionally, or alternatively, permission may be provided for particular soft lock items for selected VA, IoT devices or the like or for a selected context. For example, permission may be granted to always allow a VA or the like to order pizza.

At 408D, an option in some embodiments may include logging and/or displaying details of a granted permission. For example, and without limitation, such displaying and or logging may include identification of a particular soft lock word or phrase, a time of an occurrence, and a particular VA, IoT device and the like that processed the soft lock item.

Alternatively, at 408E, if a grant of access is denied, permission is denied to a VA, IoT device and the like and the soft lock mechanism prevents the item from leaking.

In an example use case, an embodiment of system 100 may be used in a computing environment 130 of a home. For such a use case, a set of soft block items may represent sensitive information of a personal finance nature. In such an embodiment, example word(s) may include "finance," "refinance" "checking," or "mortgage."

In another example use case, an embodiment of system 100 may be used in a computing environment 130 of a business. For such a use case, a set of soft block items may represent particular sensitive items of a trade secret nature, while perhaps treating as insensitive items that may otherwise be considered sensitive in a different context.

In another example use case, an embodiment of system 100 may be used in a computing environment 130 of a medical provider. For such a use case, a set of soft block items may represent particular sensitive items related to divulging legally controlled items.

As may also be appreciated, registration, through a registration component, such as registration component 110 as discussed in FIG. 1, may also be used to set authentication controls to be directed to a separate person than an indicated user. Benefits of such an embodiment include an ability to protect elderly of otherwise infirm persons from inadvertent leakage, thereby protecting those most likely not to appreciate being in the presence of a computing environment. The disclosed innovation provides that optionality at a later point in time from a registration event may provide editing of items that indicate soft lock functionality. In other words, a "remove from list" option may be provided in embodiments of the innovation.

Figure 5:
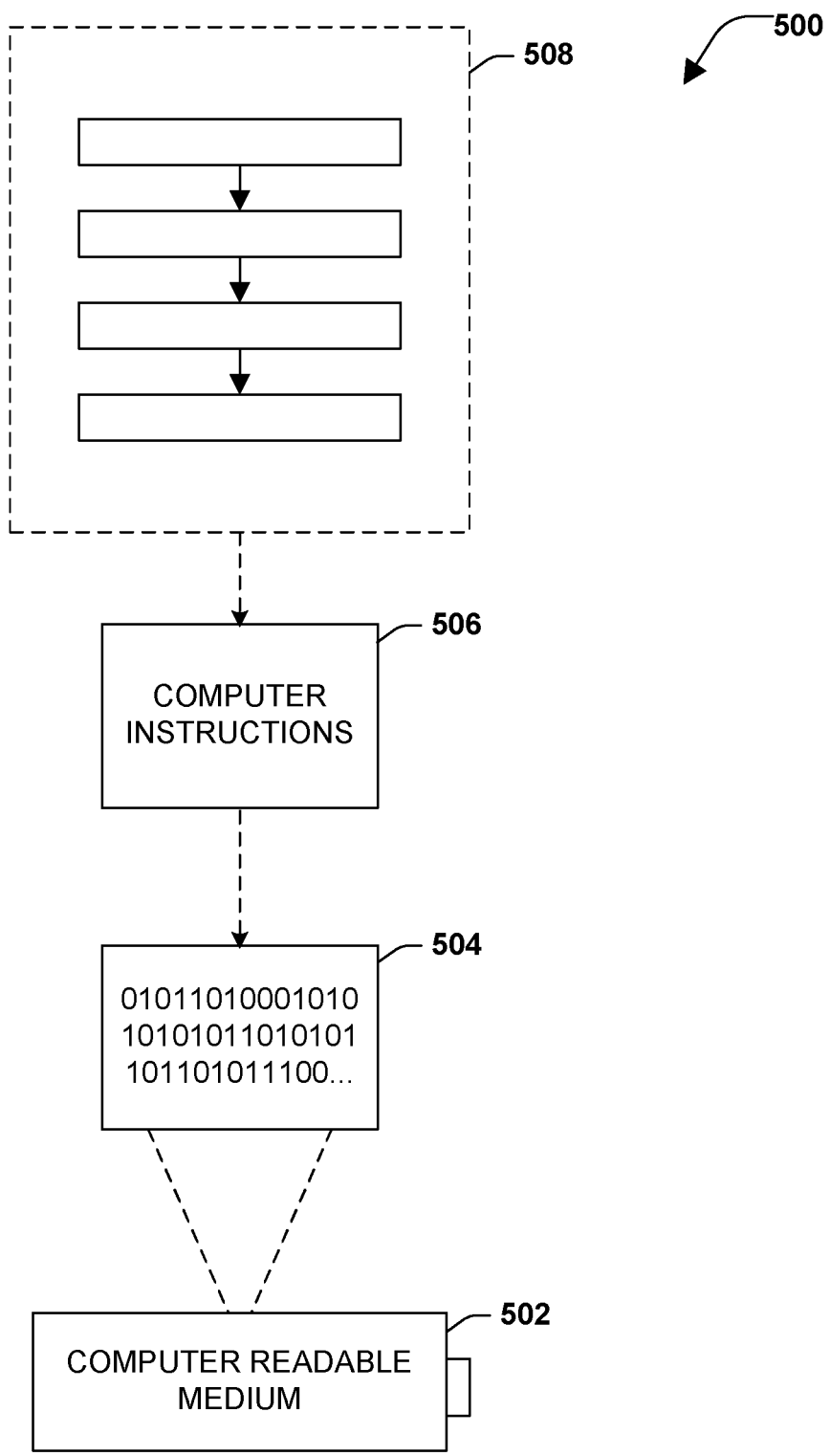
FIG. 5 is an illustration of an example technical environment where one or more of the provisions set forth herein can be implemented, according to one or more embodiments.

Still another embodiment can involve a computer-readable medium comprising processor-executable instructions configured to implement one or more embodiments of the techniques presented herein. Turning to FIG. 5 is a system 500 that indicates the technical context in which the innovation is placed. This other embodiment involves a computer-readable medium including processor-executable instructions configured to implement one or more embodiments of the techniques presented herein. An embodiment of a computer-readable medium or a computer-readable device devised in these ways is illustrated in FIG. 5, wherein an implementation of the system 500 includes a computer-readable medium 502, such as a CD-R, DVD-R, flash drive, a platter of a hard disk drive, etc., on which is encoded computer-readable data 504. This computer-readable data 504, such as binary data including a plurality of zero's and one's as shown in 504, in turn includes a set of computer instructions 506 configured to operate according to one or more of the principles set forth herein. In one such embodiment the system 500, the processor-executable computer instructions 506 may be configured to perform a method 508, such as the methods 300 or 400 of FIGS. 3 and 4. In another embodiment, the processor-executable instructions 506 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or most any combination thereof to control a computer to implement the disclosed subject matter. The term "article of manufacture" as used herein is intended to encompass a computer program accessible from most any computer-readable device, carrier, or media. Of course, many modifications may be made to this configuration without departing from the scope or spirit of the claimed subject matter.

Figure 6:
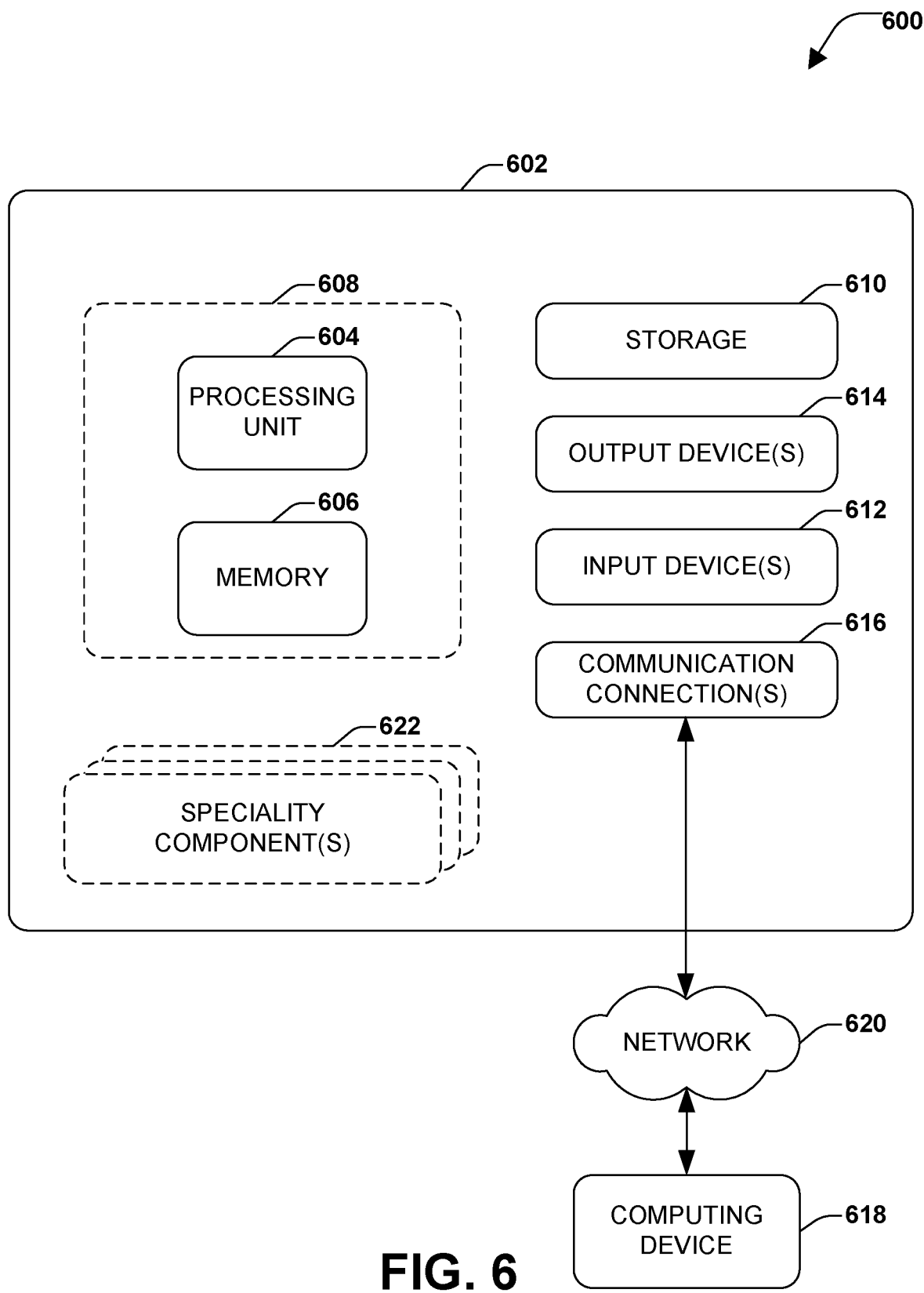
FIG. 6 is an illustration of an example technical environment where one or more of the provisions set forth herein can be implemented, according to one or more embodiments.

FIG. 6 and the following discussion provide a description of a suitable computing environment to implement embodiments of one or more of the provisions set forth herein. The operating environment of FIG. 6 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as discussed herein. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 6 illustrates a system 600 including a computing device 602 configured to implement one or more embodiments provided herein. In one configuration, computing device 602 includes at least one processing unit 604 and memory 606. Depending on the exact configuration and type of computing device, memory 606 may be volatile, such as RAM, non-volatile, such as ROM, flash memory, etc., or a combination of the two. This configuration is illustrated in FIG. 6 by dashed line 608.

In other embodiments, device 602 includes additional features or functionality. For example, device 602 may include additional storage such as removable storage or non-removable storage, including, but not limited to, magnetic storage, optical storage, etc. Such additional storage is illustrated in FIG. 6 by storage 610. In one or more embodiments, computer readable instructions to implement one or more embodiments provided herein are in storage 610. Storage 610 may store other computer readable instructions to implement an operating system, an application program, etc. Computer readable instructions may be loaded in memory 606 for execution by processing unit 604, for example.

The term "computer readable media" as used herein includes computer storage media. Computer storage media includes volatile and nonvolatile, removable and non-removable media implemented in any method or technology for storage of information such as computer readable instructions or other data. Memory 606 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 602. Any such computer storage media is part of device 602.

Device 602 includes input device(s) 612 such as keyboard, mouse, pen, voice input device, touch input device, infrared cameras, video input devices, or any other input device. Output device(s) 614 such as one or more displays, speakers, printers, or any other output device may be included with device 602. Input device(s) 612 and output device(s) 614 may be connected to device 602 via a wired connection, wireless connection, or any combination thereof. In one or more embodiments, an input device or an output device from another computing device may be used as input device(s) 612 or output device(s) 614 for computing device 602. Device 602 may include communication connection(s) 616 to facilitate communications with one or more other devices 618, and such communication may occur over a network, for example network 620. Additionally, modules or components provided may be specialty components 622, for example, as may be seen in FIGS. 1 and 2, registration component 110 and application component 120 may be specialty components 622. Additionally, or alternatively, detection component 210, control component 240 and learning component 260 may be specialty components 622. Specialty components 622 may be configured, for example, in order to transform data structures in a particular manner, or for another example, specialty components 622 may enable machine learning processes to interact with data sets. Other specialty components 622 may be configured to provide interactions with users in either a bulk or batch mode, or in an interactive setting.

Although, in accordance with some aspects, the subject matter has been described herein in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising."

Further, unless specified otherwise, "first", "second", or the like are not intended to imply a temporal aspect, a spatial aspect, an ordering, etc. Rather, such terms are merely used as identifiers, names, etc. For features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system for controlling leakage in a computing environment comprising:
   a processor; and
   a memory that stores executable instructions that, when executed by the processor, configure:
      a registration component that provides a set of settings that indicate at least an initial set of items deemed sensitive;
      an application component that detects:
         a user in a computing environment,
         an element of the computing environment,
         a conversation involving the user in the computing environment and at least a subset of the initial set of items deemed sensitive, and
         controls a technical processing of the element of the computing environment; and
      wherein the subset of the at least initial set being detected by the application component prompts an access grant determination wherein for the access grant determination is deemed allowed permits the element to process the subset of the at least initial set and wherein for the access grant determination is deemed not allowed, does not permit the element to process the subset of at least initial set unaltered.

2. The system of claim 1, wherein for the access grant determination is deemed not allowed, permits the element to process an altered subset.

3. The system of claim 2, wherein an alteration for the subset comprises at least one of a type of control of:
   masking the subset such that transmission of the subset is rendered unintelligible,
   applying a white noise filter associated with the subset, and
   taking over operational control of the element in the computing environment.

4. The system of claim 3, wherein taking over operational control comprises at least one of:
   overriding a local "send" command,
   disrupting a timing of the local "send" command, and
   making the local "send" command reliant on an authorization condition created by a control component.

5. The system of claim 1, the set of settings further comprise a context of the subset.

6. The system of claim 1, wherein the set of settings comprise a set based at least on a nature of the computing environment, and the nature is at least one of personal, medical, business, or a combination of personal, medical and business.

7. The system of claim 1 wherein the element is an active device, a passive device, or a passive device that becomes active.

8. The system of claim 1 wherein the prompt of an access grant determination is based at least in part on a detection component detecting an authorization of the user for system use, and the authorization of the user is an affirmative authorization.

9. The system of claim 1, the application component comprises a log component that is communicatively coupled to the application component, and logs a list of elements in the computing environment and interactions of the elements with the application component.

10. The system of claim 1 further comprising a learning component that augments the at least initial set of items deemed sensitive, wherein the augmenting employs at least one of an artificial intelligence technique, a machine learning technique, or a deep learning technique.

11. A method of controlling leakage in a computing environment, comprising:
   pre-activating a system, wherein pre-activating comprises:
      registering, by a registration component, that captures at least a subset of a selected word, data, or information from a set of items deemed to be sensitive, and
      requesting, by an application component, permission to engage the system;
   obtaining, by a detection component, affirmative authorization to engage the system;
   scanning, by the detection component a computing environment, wherein scanning comprises scanning the computing environment for elements and continuously or near continuously monitoring the computing environment,
   triggering the system, wherein a triggering occurs during the continuously monitoring with a detecting a user and detecting the subset, and providing notice, by the application component, to the user that the element is attempting to process an item from the subset,
   post-triggering that provides an access grant determination wherein for the access grant determination is deemed allowed permits the element to process the subset and wherein for the access grant determination is deemed not allowed, does not permit the element to process the subset unaltered.

12. The method of claim 11, wherein for the access grant determination is deemed not allowed, permits the element to process an altered subset.

13. The method of claim 12, wherein an alteration for the subset comprises one or more types of control of:
   masking the subset such that transmission of the subset is rendered unintelligible, applying a white noise filter associated with the subset, and taking over operational control of the element in the computing environment.

14. The method of claim 13, wherein taking over control comprises at least one of overriding a local "send" command, disrupting a timing of the local "send" command, and making the local "send" command reliant on an authorization condition created by a control component.

15. The method of claim 11, wherein a context of the set of items deemed sensitive is captured.

16. The method of claim 11, wherein scanning demarcates, on detected elements, the set of items deemed to be sensitive, and enables soft lock triggers on the set.

17. The method of claim 11, wherein the pre-activating step comprises an initial set of items deemed sensitive is augmented by a learning component.

18. The method of claim 11, the affirmative authorization to engage is enduring until revoked.

19. The method of claim 11, the affirmative authorization to engage is time limited, that time limited is based on at least one of a set time or a time of detected user presence in the computing environment.

20. A non-transitory computer readable medium having instructions to control one or more processors configured to:

register at least a subset of a selected word, data, or information from a set of items deemed sensitive, request permission of a user to engage a system for controlling leakage in a computing environment, obtain affirmative authorization to engage the system, scan the computing environment for elements, monitor the computing environment continuously or near continuously for detecting a user and a subset, provide notice to the user that the element is attempting to process an item from the subset; and provide an access grant determination wherein for the access grant determination is deemed allowed permits the element to process the subset and wherein for the access grant determination is deemed not allowed, does not permit the element to process the subset unaltered, but permits the element to process the subset altered, and wherein an alteration for the subset comprises one or more types of control of:

masking the subset such that transmission of the subset is rendered unintelligible, applying a white noise filter associated with the subset, and taking over operational control of the element in the computing environment.

\* \* \* \* \*